United States Patent [19]

Broughton

[11] Patent Number: 4,554,074
[45] Date of Patent: * Nov. 19, 1985

[54] SEPARATOR FOR IMMISCIBLE FLUID MIXTURE

[76] Inventor: Amos W. Broughton, P.O. Box 505, Temple City, Calif. 91780

[*] Notice: The portion of the term of this patent subsequent to Aug. 2, 2000 has been disclaimed.

[21] Appl. No.: 633,049

[22] Filed: Jul. 20, 1984

[51] Int. Cl.⁴ .................................. C02F 1/40
[52] U.S. Cl. .................................. 210/519; 210/187; 210/521; 210/540; 210/DIG. 5
[58] Field of Search ............... 210/801, 802, 187, 320, 210/519, 521, 522, 538, 540, DIG. 5

[56] References Cited

U.S. PATENT DOCUMENTS

| | | | |
|---|---|---|---|
| 1,490,794 | 4/1924 | Alexander | 210/801 |
| 1,493,861 | 5/1924 | Kusch | 210/519 |
| 2,025,883 | 12/1935 | Mobley | 210/801 |
| 2,134,113 | 10/1938 | Ehle | 210/802 |
| 2,610,697 | 9/1952 | Lovelady | 210/801 |
| 2,728,457 | 12/1955 | Clarke | 210/801 |
| 2,883,059 | 4/1959 | Puddington | 210/519 |
| 2,932,397 | 4/1960 | Ogden | 210/540 |
| 2,946,451 | 7/1960 | Culleton | 210/519 |
| 3,141,000 | 7/1964 | Turner | 210/519 |
| 3,147,221 | 9/1964 | Johnston | 210/320 |
| 3,246,763 | 4/1966 | Baum | 210/519 |
| 3,672,511 | 6/1972 | Watson | 210/519 |
| 4,038,186 | 7/1977 | Potter | 210/540 |
| 4,396,508 | 8/1983 | Broughton | 210/187 |
| 4,406,789 | 9/1983 | Brignon | 210/519 |

FOREIGN PATENT DOCUMENTS 208601 5/1907 Fed. Rep. of Germany ...... 210/540

Primary Examiner—Ernest G. Therkorn
Attorney, Agent, or Firm—J. L. Jones

[57] ABSTRACT

A separator for multiple phase fluids has a unitary fluid separator box formed as a single metal plenary chamber, and alternatively as a simple fluid distribution box of a single plastic form. Each of the single plenum chamber branching channel box has a top fluid constricting support plate and a bottom support plate, with an inlet fluid channel which branches to a first pair of channels having each channel cross section equal to the single inlet channel, the first pair of channels each branching to a second pair of channels, also each having the inlet channel cross section, the second pair of channels can also each have a third pair of channels of outlet channel cross section, and so on. The inlet channel turbulent fluid flow is transformed by multiple dual channel splitting and flow into a substantially laminar fluid flow, allowing phase separations. A wide mouth inlet inverted funnel baffle is secured and disposed above the unitary separator box to collect and channel the oil and the like low density fluids from the multiphase inlet fluid to outside use, while allowing the high density fluids to exit under and around its base or wide mouth inlet to separate fluid discharge.

4 Claims, 5 Drawing Figures

U.S. Patent  Nov. 19, 1985  Sheet 1 of 2  4,554,074
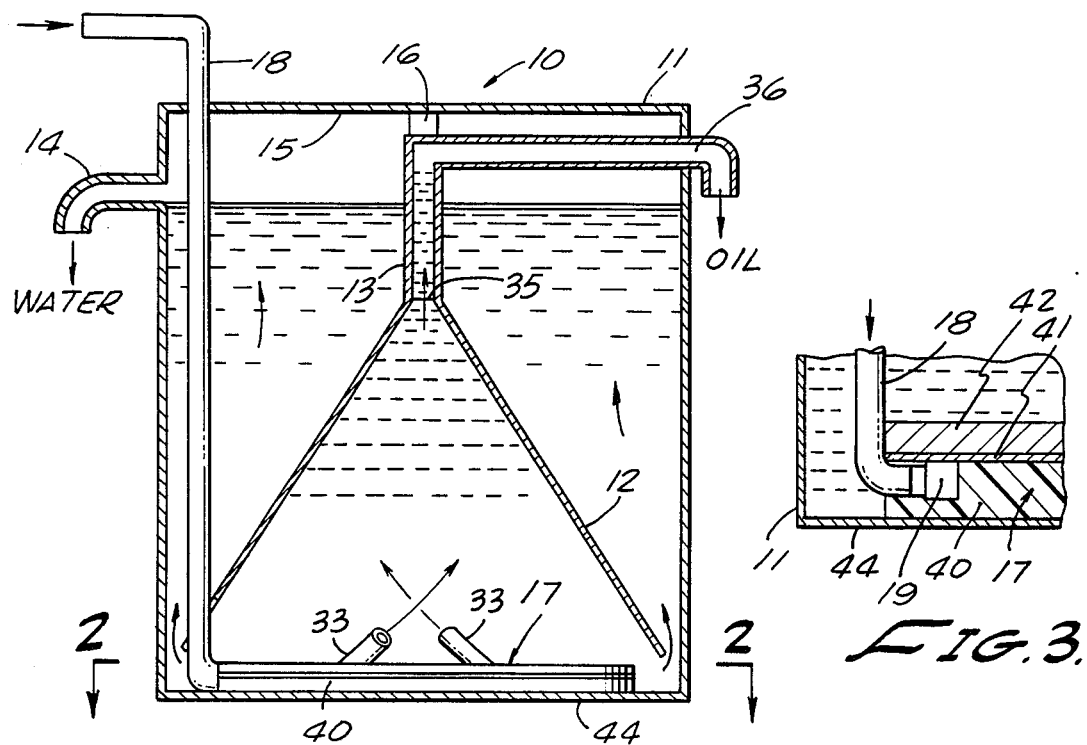
FIG. 1.
FIG. 3.
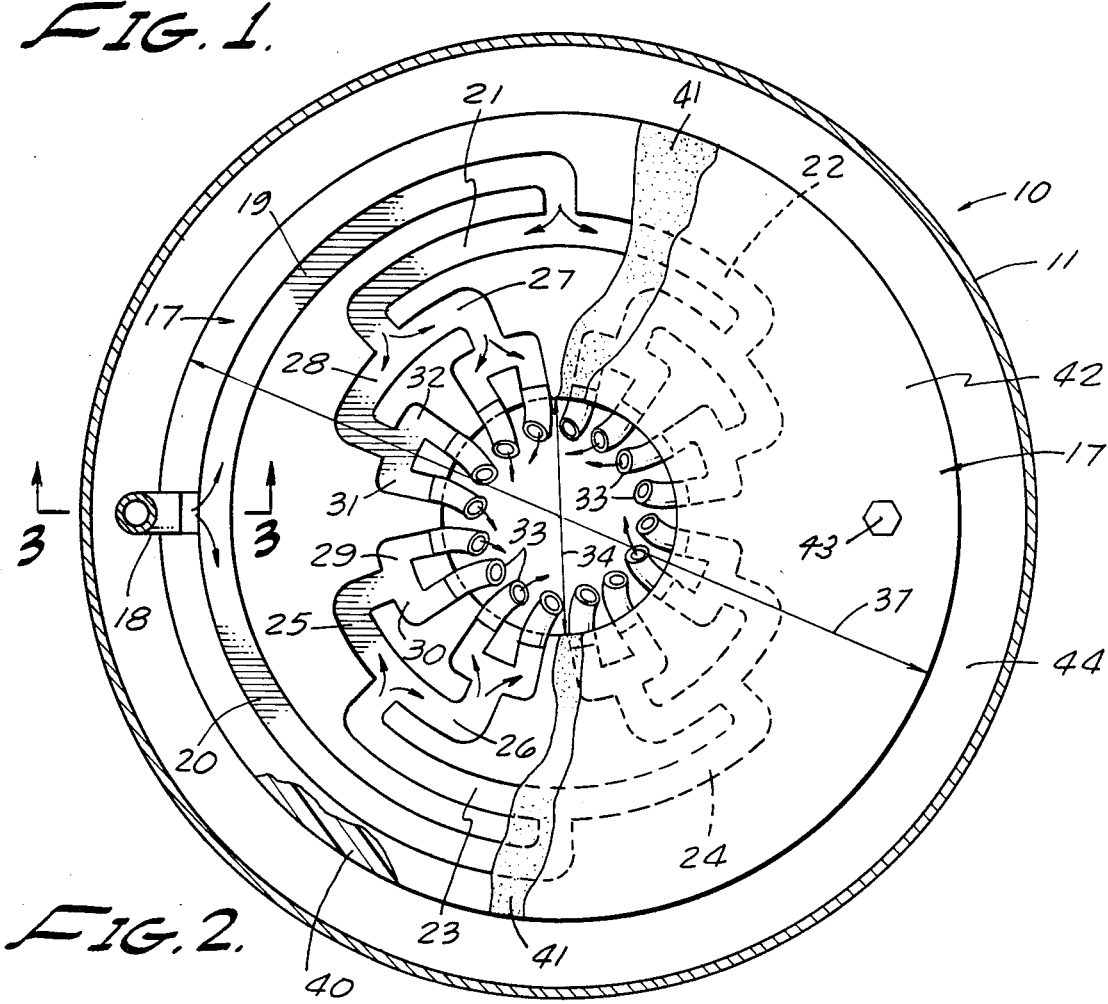
FIG. 2.

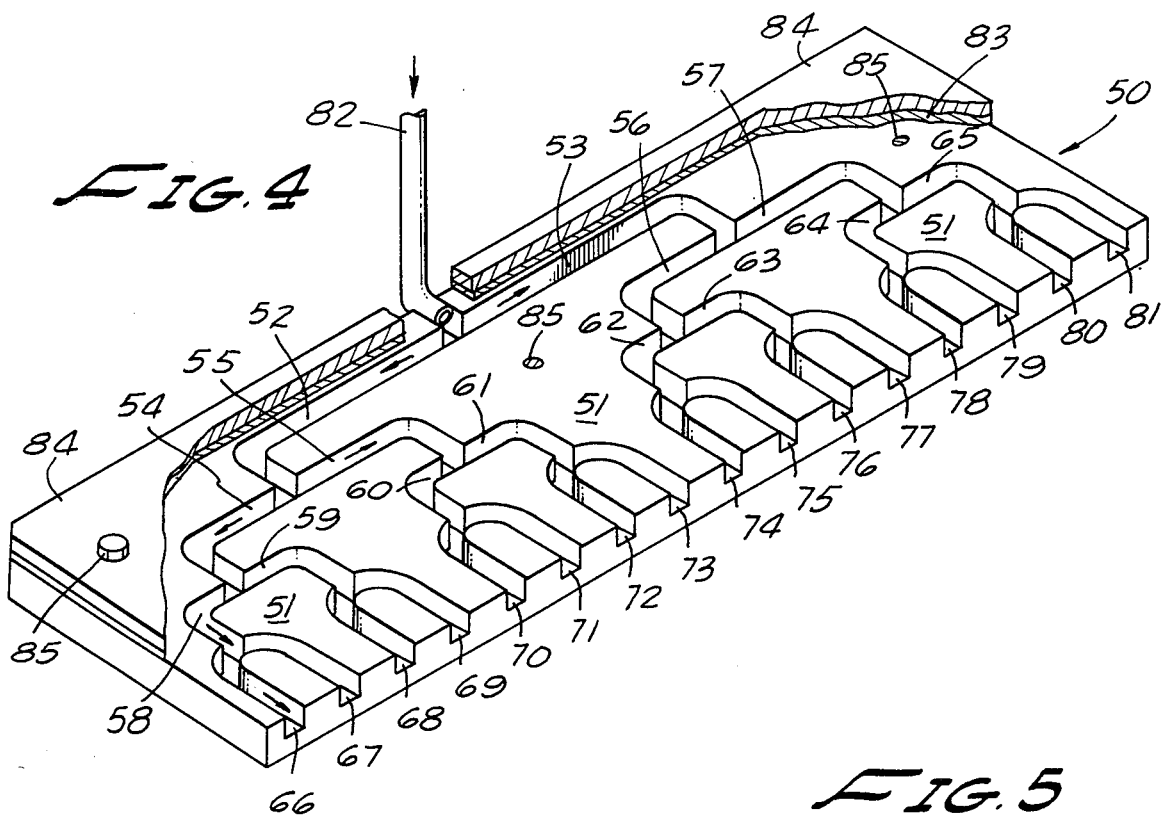
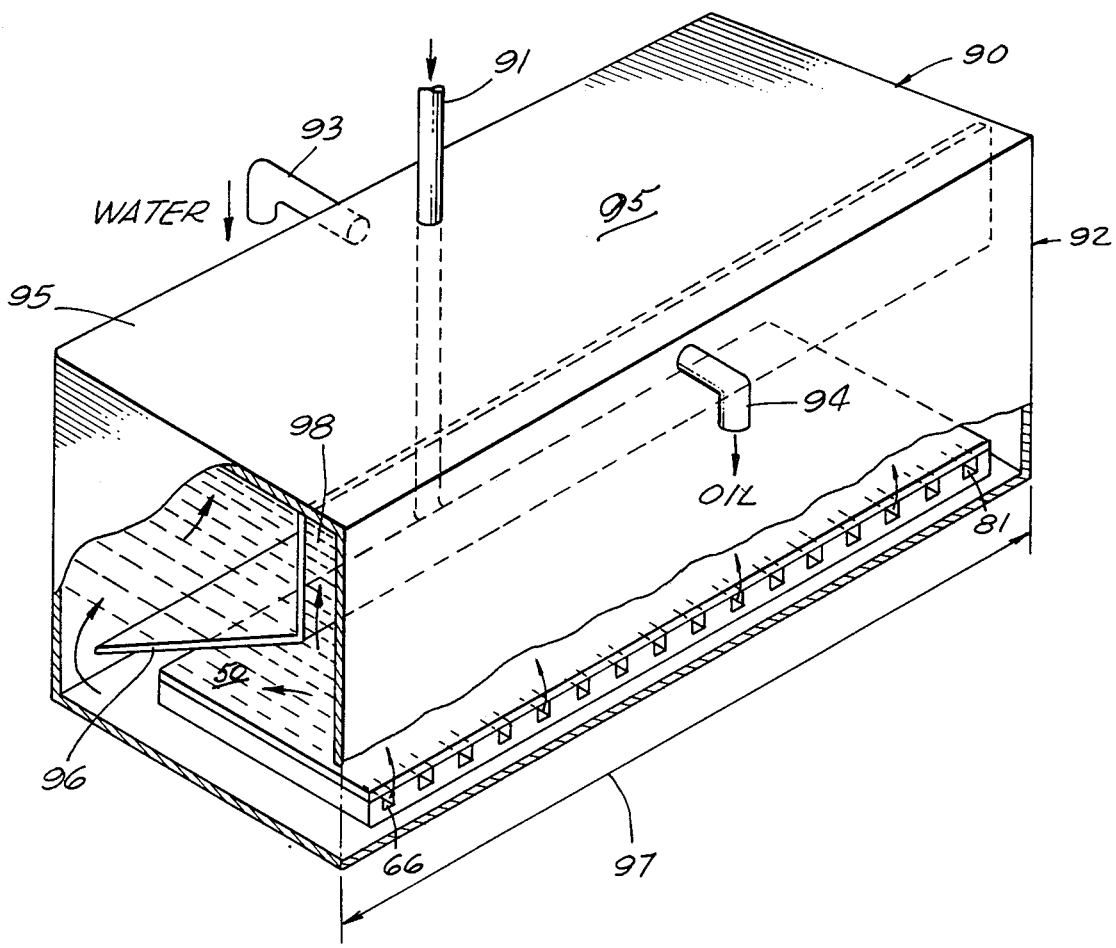

SEPARATOR FOR IMMISCIBLE FLUID MIXTURE

BACKGROUND OF THE INVENTION

The separator for immiscible fluid mixtures of this invention is classified in Class 210/187 and the like.

In U.S. Pat. No. 4,396,508, issued Aug. 2, 1983, Broughton discloses and claims a separator of oil, water phase, and sludge phase in a multiple pipe liquid spreaded disposed across and near the inside base of a closed separator tank. The low velocity inlet spreader accepts a turbulent inlet velocity multiple phase liquid and reduces it to a very slow velocity laminar flow spreader outlet fluid, disposed under a tank flat baffle plate. The separated low density oil phase rises to the tank separator top, separating from the water phase, and the oil phase is separately collected from the aqueous phase. A solid phase can also be separately collected at the tank base.

In U.S. Pat. No. 4,122,016 issued Oct. 24, 1978 Tao and Warner disclose a settling tank for oil, water and solid mixtures, in which two inclined and parallel baffles have underside V-shaped grooves disposed thereon, suitable for entrapping, guiding and coalescing oil droplets into large globs for channeling and passing through openings between baffles.

Middelbeek, in U.S. Pat. No. 4,202,778 issued May 13, 1980, disclosed parallel upright sloping plates disposed in a separator housing, a stilling space arranged in the front of the separator, and having a first collecting space on the top side of the first collecting space for low density substances (oils and the like).

Johnston, in U.S. Pat. No. 3,147,221 issued Sept. 1, 1964, discloses an influent distribution means for the introduction of a suspension into a tank for settling or flotation separation of suspended material. The feed is directed against one or more disk baffles to be spread over the influent end wall of the tank. The required baffle means provides boundaries and need be only about six inches wide and only project that distance into the tank.

In U.S. Pat. No. 3,886,064 issued May 27, 1975, Kosonen disclosed and claimed a lamellar separator provided with adjustable regulating plates, which are arranged in front of outlet openings in order to insure a uniform distribution of the total flow through the separator channels to compensate a poor alignment of the separator.

SUMMARY OF THE INVENTION

An improved fluid separator for immiscible fluid mixtures has an unitary fluid separator box formed as a single metal plenary chamber, and alternatively as a single fluid separator box of a single plastic plenum form. Each box has paired branching channels disposed therein, each box having a bottom support plate and a top support plate. Each of the single metal plenum chamber and the plastic plenum form have an initial inlet channel which then branches into first pair of channels, then each first pair of channels branch into a second pair channels, then each second pair of channels branch into a third pair of channels, and so forth as is necessary.

The function of the pairs of channels, all of substantially equal cross section area to the original inlet channel, is to provide for the conversion of the initial inlet turbulent higher velocity of immiscible fluid mixture flow into substantially laminar low velocity fluid flow, and separation of the immiscible fluid mixture into discrete separate phases.

The inlet channel turbulent fluid velocity is transformed by multiple paired channel splitting in substantially laminar flow velocity, allowing multiple fluid flow separation of the multiple phases. Shaped nozzles can be secured and disposed on the final multiple channel outlets to direct the channel outlet flows in the desired vector direction. An inverted funnel baffle with the wide mouth can be disposed and secured above the plenum chamber, or above the plastic fluid separator box which alternatively constitute the unitary separator box. The wide mouth of the funnel can collect the separating and lower density oil phase, which rises to the narrow inverted funnel channel outlet. The separating multiple phases can be directed inwardly from a donut shaped fluid separator box having the multiple outlet channels disposed around the inner central donut aperture. The fluid outlet channels can have nozzles secured thereon which direct the fluid flow upward in a centrally disposed swirling vectored motion.

Included in the objects of this invention are:

To provide an inproved unitary fluid separator box for separation of immiscible fluid mixtures.

To provide a flat, shaped unitary fluid separator box for separating immiscible fluid mixtures, said separator box having outlet fluid flow channels disposed under a baffle means.

To provide an inverted funnel baffle disposed and secured above a unitary fluid separator box, the wide funnel inlet spread enveloping over the separator box outlets, and the narrow funnel outlet disposed above the funnel inlet, said funnel outlet providing conductive pipe outlet for the separated fluid less dense than the water phase.

To provide a flat unitary fluid separator box formed of metal, plastic, or other formable material, said box having a top and a bottom plate, a single inlet channel, which branches into a pair of first channels, then each first channel branching into a set of second pair of channels, then each second pair of channels branching into a third pair of channels. All of these channels have the same cross sectional areas as the inlet channel, providing for the conversion of high velocity turbulent inlet multiple immiscible fluid mixture into a very low velocity laminar flow multiple fluid mixture, in which an oil phase, or like low density fluid, is separating from the water phase.

To provide velocity vectoring nozzles on the outlet channels of the unitary fluid separator box, the nozzles directing the vectored linear outlet fluid flow as is required.

Other objects and advantages of this invention are taught in the following description and claims.

BRIEF DESCRIPTION OF THE DRAWINGS

The description of this invention is to be read in conjunction with the following drawings:

FIG. 1 is an elevational cross sectional view of the improved separator of this invention, utilizing an inverted funnel baffle for collecting the low density phase.

FIG. 2 is a planar partial sectional view through 2—2 of FIG. 1 of the unitary fluid separator box formed as a unit in this invention.

FIG. 3 is a partial sectional view of a portion through 3—3 of FIG. 2.

FIG. 4 is a rectangular isometric projection of another unitary fluid separator box of this invention.

FIG. 5 is an isometric view of a separator apparatus having a unitary fluid separator box of FIG. 4.

DESCRIPTION OF THE PREFERRED EMBODIMENT OF THE INVENTION

The improved fluid mixture separator 10 of FIG. 1 is illustrated in cross sectional view, including a circular tank 11 with a circular inverted funnel baffle 12, an oil and low density fluid phase outlet pipe 13, and a water phase outlet pipe 14 secured to the tank 11, adjacent the tank top 15. The low density fluid phase outlet pipe 13 also exits the tank 11 adjacent its tank top 15, the pipe 13 being supported at the top 15 by a pipe hangar 16. The pipe hangar 16 also centrally disposes and secures the funnel baffle 12 in the tank 11 interior.

Referring to FIGS. 1 and 2 in combination the unitary fluid separator box 17 is shown in elevational and plan view to be a circular separator box, having an immiscible fluid mixture inlet pipe 18 of selected inlet channel cross section. The inlet pipe 18 branches into a first pair of channels 19 and 20, each of which branches into a second pair of channels 21, 22 and 23, 24. The second pair of channels 21, 22, 23 and 24, in turn each paired channels branch into a third pair of channels 25, 26 and 27, 28. Finally the third pair of channels branch into a fourth pair of channels 29, 30 and 31, 32.

All of the channels 18, 19, 20, 21, 22, 23, 24, 25, 26, 27, 28, 29, 30, 31 and 32 and the like channels have the same cross sectional channel areas. As a result of the equal channel areas, the initial turbulent inlet channel mixture velocity is transformed by the fourth paired channel splitters into substantial linear velocity fluid flow mixture. The initial immiscible fluid mixture has separated into two fluid mixtures, and the separating phases mixture are expelled through the multiple curved exit nozzles 33 into two separate fluid phases. The multiple exit nozzles 33 extend into the doughnut shaped aperture 34, the multiple nozzles shaped and disposed to give a rotational swirling motion to the two separate phases. The less dense phase (oil) rises upward and under the collector funnel baffle 12 to the collector throat 35 and flows out of oil outlet pipe 36.

The unitary fluid separator box 17, as illustrated in FIGS. 1 and 2, is a circular box having an exterior diameter 37 and an interior doughnut aperture diameter 34. The separator box 17 is shown in FIGS. 2 and 3 to have a circular box form base 40 with the channels 19 to 32 molded therein, the channels 19–32 having cross section areas equivalent to the inlet pipe 18 area. The composition of box 40 can be a molded plastic such as epoxy resin, polyester resin, or any of several conventional inorganic cements, with the channels 19–32 molded in an impermeable base. The inlet pipe 18 is disposed and secured in box 40. Box 40 has a thin sealing gasket 41, and a rigid impermeable plate 42. Gasket 41 and plate 42 conform to the box 40 diameter 37 and are secured together by multiple bolt means 43. Box 40 rests on the bottom 44 of tank 11.

Referring now to FIG. 4, there is illustrated a rectangular unitary fluid separator box 50, having a separator form base 51 with molded paired channels 52–81. The terminal outlet channels 66–81, as well as the secured inlet channel 82 and paired channels 52–53 through channels 64–65 all have the same cross sectional channel areas, leading to substantially linear fluid flow at the terminal outlets 66–81. Again, the molded form base 51 can be molded plastic and cast elements of conventional types. The base 51 can also be made of thin sheet metal structure, soldered into the shape of base 51, and also a welded steel form 51 shape.

The box 50 has a thin flexible gasket cover 83 and a rigid plate of metal 84 securing gasket cover 83. The box 50 is secured together by multiple bolt securing means 85.

Referring to FIG. 5, the unitary separator form box 50 of FIG. 4 is shown disposed in a rectangular separator for immiscible fluid mixture 90. The separator 90 has an inlet channel 91 disposed and secured through the rectangular tank 92, channel 91 being equivalent to channel 82 of FIG. 4. The tank 92 has a water outlet pipe 93 and an oil (or less dense immiscible phase) outlet pipe 94 each disposed and secured adjacent the top 95 of tank 90. The tank baffle 96 is shown disposed the length 97 of the tank 92, and baffle 96 is secured to the top 95 of tank 90, forming a separation zone 98 for the low density separated phase of the immiscible fluid. The baffle 96 and separating zone 98 are shown disposed, so that the outlet channels 66–81 of the separator box 50 are disposed directly under the zone 98. The outlet channels 66–81 disposition are directly 180° opposed to the relative outlet channel-baffle disposition of U.S. Pat. No. 4,396,508, this inventor's earlier invention in separators. This present placement of channel outlets-baffle disposition is an inventive advance in the separator art.

This inventor has illustrated a circular-doughnut shaped separator box 17 and a rectangular fluid unitary separator form box 50, and other shaped fluid separator boxes may be utilized as become necessary. It is useful to utilize cast form bases 40 and 51, which include the multiple channels disposed in the bases.

The inverted funnel can have a wide funnel inlet, shaped in other geometrical shapes, such as square, rectangular, or polygon, and conveying to square, rectangular or polygon exit outlets. The general materials of construction of the separator can be suitably sized as required, and can be steel, nickel, reinforced fiberglass molding, or the like.

Many modifications in the separator for immiscible fluid mixtures can be made in the light of my teachings. It is understood that within the scope of the claims, the invention can be practiced otherwise than as described.

I claim:

1. The separator for immiscible fluid mixtures in combination in a separator tank, comprising:

a unitary fluid flat, shallow separator having required width and length dimensions and a single formed plenum chamber having a flat affixed cover with a single inlet channel having a selected channel cross section area, said single inlet channel branching into the first two branch channels having at least aforesaid channel cross section area, said first two branch channels each multiple branching into paired branch channels having at least aforesaid channel cross section area, said multiple branch channels each multiple branching into further outlet channels having at least aforesaid channel cross section area, providing transition of the turbulent inlet fluid flow to substantially laminar fluid flow in said final outlet channels, aforesaid separator disposed on the separator tank base, a baffle disposed above and encompassing said unitary fluid flat separator, all said final outlet channels disposed underneath said baffle, said baffle having a narrow outlet aperture providing an outlet for an immiscible fluid less dense than water, aforesaid tank combination having an immiscible fluid mixture inlet means secured to said inlet channel, an outlet means for a separated water phase, and an outlet means for a separate immiscible less dense than water phase.

2. The separator for immiscible fluid mixtures in combination in a separator tank, comprising:

a unitary fluid flat, shallow separator having required width and length dimensions and a single formed plenum chamber having a flat affixed cover with a single inlet channel having a selected channel cross section area, said single inlet channel branching into a first two branch channels having at least aforesaid channel cross section area, said first two branch channels each branching into a pair of second branch channels having at least aforesaid channel cross section area, said pair of second branch channels each branching into a pair of third outlet channels having at least aforesaid channel cross section area, said pair of third outlet channels each branching into a pair of fourth outlet channels having at least aforesaid channel cross section area, providing transition of the turbulent inlet fluid flow to substantially laminar fluid flow in said outlet paired fourth channels, aforesaid separator disposed on the separator tank base, a funnel baffle disposed above and having a wide funnel mouth encompassing said unitary fluid flat separator box, all said final chambers disposed underneath said funnel baffle, said funnel baffle having a narrow funnel outlet aperture providing an outlet for an immiscible fluid less dense than water, aforesaid tank combination having an immiscible fluid mixture inlet means secured to said inlet channel, an outlet means for a separated water phase, and an outlet means for a separate immiscible less dense than water phase.

3. The separator for immiscible fluid mixtures in combination in a separator tank, comprising:

a unitary fluid flat, shallow separator having required width and length dimensions and a single formed plenum chamber having a flat affixed cover with a single inlet channel having a selected channel cross section area, said single inlet channel branching into a first two branch channels having at least aforesaid channel cross section area, said first two branch channels each branching into a pair of second branch channels having at least aforesaid channel cross section area, said pair of second branch channels each branching into a pair of third outlet channels having at least aforesaid channel cross section area, providing transition of the turbulent inlet fluid flow to substantially laminar fluid flow in said outlet paired third channels, aforesaid separator disposed on the separator tank base, a funnel baffle disposed above and having a wide funnel entrance mouth encompassing said unitary fluid flat separat box, all outlet channels disposed underneath said funnel baffle, said funnel baffle having a narrow funnel outlet aperture providing an outlet for an immiscible fluid less dense than water, aforesaid tank combination having an immiscible fluid mixture inlet means secured to said inlet channel, an outlet means for a separated water phase, and an outlet means for a separate immiscible less dense than water phase.

4. The separator for immiscible fluid mixtures in combination in a separator tank, comprising:

a unitary fluid flat, shallow separator having required width and length dimensions, and a central doughnut aperture, and a single formed plenum chamber having a flat fixed cover, with a single inlet channel having a selected channel cross section area, said single inlet channel branching into a first two branch channels having at least aforesaid channel cross section area, said first two branch channels each branching into second branch channels having at least aforesaid channel cross section area, said second branch channels each branching into third outlet channels having at least aforesaid channel cross section area, said third outlet channels disposed around and opening onto said central doughnut aperture, providing transition of the turbulent inlet fluid flow to substantially laminar fluid flow in said outlet third channels, aforesaid separator disposed on the separator tank base, a funnel baffle disposed above and having a wide funnel mouth encompassing said unitary fluid flat separator box, said third outlet channel opening onto said central aperture and disposed underneath said funnel baffle, said funnel baffle having a narrow funnel outlet aperture providing an outlet for an immiscible fluid less dense than water, aforesaid tank combination having an immiscible fluid mixture inlet means secured to said inlet channel, an outlet means for a separated water phase, and an outlet means for a separate immiscible less dense than water phase.

* * * * *